United States Patent Office 3,594,178
Patented July 20, 1971

3,594,178
ALKALINE TREATMENT OF HOPS AND RESULTING PRODUCT
Sidney S. Meisler, 3702 Richey Road,
Yakima, Wash. 98902
No Drawing. Filed Dec. 26, 1968, Ser. No. 787,193
Int. Cl. C12c 3/00
U.S. Cl. 99—50                    17 Claims

ABSTRACT OF THE DISCLOSURE

A hops product, including the lupulin glands of hops, having improved effectiveness is obtained by subjecting hops material, such as baled dried hops, loose, field dried hops or the separated lupulin glands of hops, to contact with a gaseous or vaporized alkaline-acting treating agent, such as anhydrous ammonia, ammonium hydroxide and/or aqueous sodium hydroxide, subsequently treating the hops material with a gaseous or vaporized agent, such as hydrogen chloride, hydrochloric acid or methyl chloride, and subjecting the resulting treated hops material to a reduced pressure to effect removal of the readily voltalizable materials therefrom.

---

This invention relates to hops. More particularly, this invention relates to the treatment of hops to produce a hops product useful in brewing, such as in the brewing of beer. In accordance with one embodiment, this invention is directed to a process for the treatment of hops, particularly the lupulin glands of hops, to yield an improved hops product. In accordance with another embodiment this invention is directed to an improved process for the treatment of hops.

Various processes have been proposed for the treatment of hops, see particularly U.S. Pats. 2,243,143, 3,104,974, 3,143,425 and French Pat. 1,342,581. For the most part, however, these processes have not been completely satisfactory or successful from a commercial point of view and/or for the production of a hops product having improved effectiveness when employed in a brewing operation.

Most processes employed heretofore for the production of a hops concentrate or a hops product having improved properties or effectiveness in a brewing operation have included a solvent extraction operation wherein hops are treated with a selective solvent for the removal and concentration of an active hopping ingredient from the hops.

It is an object of this invention to provide an improved process for the treatment of hops.

It is another object of this invention to provide a hops product having improved effectiveness in a brewing operation.

Still another object of this invention is to provide an improved process for the treatment of the lupulin glands of hops, either separated from the hops and/or the strobile of the hops or without separation from the hops or strobile.

How these and other objects of this invention are achieved will become apparent in the light of the accompanying disclosure. In at least one embodiment of the practice of this invention at least one of the foregoing objects will be achieved.

In accordance with this invention it has been found that an improved hops product and process of treating hops is achieved by treating hops material either baled whole dried hops, loose field dried hops or the separated lupulin glands thereof, by exposing the same to contact with a gaseous or vaporous alkaline-acting agent, such as anhydrous ammonia, ammonium hydroxide and/or alkali metal hydroxide, e.g. sodium hydroxide. Satisfactory results are obtained when the hops material is subjected to contact with ammonia under substantially anhydrous conditions, i.e. without the addition of extraneous water or water vapor.

More particularly, in accordance with one embodiment of the practice of this invention, an improved hops product is obtained by subjecting hops, such as baled dried hops, loose field dried hops or the lupulin glands separated from the hops, such as by shaking or otherwise mechanically removed from the hops, to a reduced pressure, i.e. a pressure substantially below ambient or atmosperic pressure. The hops material is subjected to a reduced pressure as a pretreatment operation to separate the readily volatilizable materials, such as the volatile oily materials. This vacuum pretreatment or reduced pressure pretreatment may be conveniently carried out at ambient temperature or at a temperature up to about 150–200° F. It has been found that satisfactory results are obtainable if the vacuum pretreatment operation is carried out for a relatively short period of time, such as in the range 2–30 minutes, more or less, depending upon the temperature.

Following the vacuum pretreatment operation the hops material is subjected to contact with a gaseous or vaporous alkaline-acting agent, e.g. anhydrous gaseous ammonia. This treatment operation is also carried out at a convenient temperature, such as a temperature in the range 35 to 200° F., more or less, and at a suitable pressure, such as atmospheric pressure or a pressure above or below atmospheric, e.g. an ammonia partial pressure in the range from about 5 pounds p.s.i. up to a pressure of about 30 p.s.i., more or less. Higher or lower pressures might be employed if desired. The treatment operation is carried out for a relatively short period of time in the range from about 2–60 minutes, more or less, depending upon the temperature, the concentration or partial pressure of the treating agent, the treating agent employed and/or the condition of the hops material undergoing treatment.

Following this treatment operation, such as treatment with gaseous ammonia, the hops material is subjected to a reduced pressure, such as a vacuum of about 28–29 inches of mercury, to effect removal of the excess residual alkaline-acting agent, such as ammonia. Usually ammonia removal is completed in a relatively short time in the range from about 2–30 minutes depending upon the reduced pressure or vacuum employed. Following this operation the hops material is then treated with a gaseous or vaporized agent, such as methyl chloride, or an acid-acting material such as hydrogen chloride and vaporous hydrochloric acid. This treatment operation is carried out to effect removal and/or neutralization of any remaining ammonia or alkaline-acting agent derivative formed in the hops product during the previous treatment operation. This operation, like the preceding operations, is carried out at ambient or other suitable temperature and for a relatively short period of time, such as a period of time in the range 5–60 minutes, more or less, depending upon the concentration of the gaseous or vaporized treating agent or gaseous or vaporous acid-acting material employed.

Following this treatment the hops material is then subjected to a final vacuum treating operation at a reduced pressure, such as about 28–29 inches Hg., for a relatively short period of time, such as in the range 2–20 minutes, more or less, and also at ambient or other suitable temperature to effect removal of the readily volatilizable material from the hops, such as the remaining unreacted gaseous acid-acting agent.

There is produced as a result of the described sequence of operations a stable hops product which is specially suitable for use in a brewing operation, e.g. in worting or in post fermentation addition. The resulting treated hops product has improved effectiveness in the sense that in a conventional brewing operation the resulting hops product evidences on a weight basis an improved effectiveness up to about 3 times that of regular hops or equivalent regular hops product.

In the initial vacuum pretreatment operation wherein the hops material is subjected to a reduced pressure, any suitable reduced pressure may be employed to effect the removal of the readily volatile compounds from the hops material. It is desirable, however, that this initial vacuum pretreatment operation be carried out expeditiously and in a matter of minutes. To this end therefore it is desirable that the vacuum pretreatment be carried out at a high vacuum, e.g. 28–29 inches Hg or higher.

The treatment of the hops material with gaseous anhydrous ammonia is preferably carried out at temperatures not greater than about 100° F. If vaporous ammonium hydroxide is employed the treatment temperature is preferably not greater than about 150° F. and if vaporous aqueous sodium hydroxide is employed the temperature is preferably not greater than about 150–200° F. The treatment operation can be carried out over a wide pressure range from a reduced pressure, substantially below atmospheric pressure, e.g. from about 5–10 inches Hg. vacuum, to atmospheric pressure. If desirable, the treatment operation may be carried out at a supra-atmospheric pressure, such as a pressure upwards of about 5–25 pounds per square inch above atmospheric pressure.

In the practice of this invention other materials may be employed in admixture with or as a substitute for ammonia. Suitable such materials include aqueous ammonium hydroxide, aqueous sodium hydroxide, as aforementioned, and the relatively low molecular weight aliphatic amines, particularly the primary amines. Suitable such amines include the primary alkylamines, such as methylamine, ethylamine. Other suitable substitutes include hydrazine, hydroxylamine, the monohaloamines, such as monochloramine or chloramine and the like.

Following the treatment of the hops material with gaseous ammonia which is desirably carried out under anhydrous conditions, i.e. without the addition of extraneous water or water vapor to the hops material undergoing treatment, or after treatment with another alkaline-acting treating agent, the hops material is again subjected to a reduced pressure for a period of time sufficient to remove any residual excess ammonia or other treating agent. Thereupon, the hops material is subjected to contact with another treating agent, preferably an acid-acting or acidic treating agent, such as gaseous hydrogen chloride or vaporized hydrochloric acid, under conditions to neutralize or effect the removal of any remaining ammonia or the like treating agent. In place of an acidic treating agent a low molecular weight halogenated hydrocarbon, such as a Freon, trichloroethane or an alkyl chloride, e.g. methyl chloride, or an alkylene halide, such as ethylene dichloride, may be employed. This treating operation may be carried out at atmospheric pressure or the pressure above or below atmospheric pressure, preferably at a subatmospheric pressure, e.g. at a vacuum in the range 2–10 inches Hg. mercury. Other materials, particularly acidic, normally gaseous materials, are useful as a substitute for methyl chloride or hydrogen chloride in this treating operation. Suitable such materials would appear to be sulfur dioxide, carbon dioxide, especially when employed at a pressure above atmospheric pressure, and mixtures thereof, and especially in combination with hydrogen chloride and/or methyl chloride.

After this treatment the hops material is again subjected to a reduced pressure to effect removal of the readily volatile materials including the various treating agents. The resulting treated hops material is then recovered. The recovered hops material is stable and can be stored for a substantial length of time. The hops material, whether baled dried hops or the lupulin glands of hops, can be employed with improved effectiveness in conventional brewing operations. It has been found that hops material treated in accordance with this invention on a weight basis is a number of times more effective as a hopping agent than conventional comparable hops material. If desired, the resulting treated hops material can be further treated, such as by solvent extraction, to separate therefrom a concentrate or extract useful as a pre-isomerization hops concentrate or extract.

The following examples are illustrative of the practices of this invention:

EXAMPLE 1

A 200 pound bale of dried hops was placed in a container, heated to 140° F. and a vacuum applied. The pressure within the container was reduced to about 25–50 mm. Hg, equivalent to about 28–29 inches Hg vacuum. The hops were subjected to this reduced pressure for a period of time of about 10 minutes. Upon introduction into the container the baled dried hops had a moisture content in the range 5 to 8% by weight. After the above-described treatment the baled dried hops lost about 2% by weight moisture.

Following the vacuum treatment the hops, still within the container, were contacted with gaseous anhydrous ammonia which was introduced into the container. During the treatment of the hops with gaseous ammonia the pressure in the container was about 625 mm. Hg, equivalent to a vacuum of about 5 inches Hg. The hops were exposed to contact with the gaseous ammonia at ambient temperature for about 30 minutes.

Following the ammonia treatment operation the hops, still in the container, were again subjected to a vacuum of about 28–29 inches Hg for about 10 minutes so as to remove excess ammonia.

After this vacuum treatment for the removal of excess ammonia the hops, still within the container, were subjected to contact with vaporized methyl chloride for about 30 minutes. This treatment with vaporized methyl chloride can be carried out at any suitable convenient pressure. Treatment of the hops with methyl chloride at slightly above atmospheric pressure up to 5 p.s.i.g. yields satisfactory results.

Following the treatment with methyl chloride the hops, still within the container, were again subjected to a vacuum of about 28–29 inches Hg for a period of time, such as about 10 minutes, to remove any residual methyl chloride and various other readily volatile materials found. The resulting treated hops were then removed from the container and, if desired, may be employed directly in a conventional brewing operation as a hopping agent or stored for subsequent use.

EXAMPLE 2

A 200 pound bale of dried hops was treated in accordance with the procedure outlined in Example No. 1 save vaporized aqueous ammonium hydroxide was employed at a temperature of about 100° F. instead of gaseous anhydrous ammonia. This test was repeated but with vaporized aqueous ammonium hydroxide at a temperature of 140° F.

EXAMPLE 3

A 200 pound bale of dried hops was treated in accordance with the procedure outlined in Example 1 save vaporized aqueous sodium hydroxide was employed at a temperature of about 100° F. instead of gaseous anhydrous ammonia. This test was repeated but with vaporized aqueous sodium hydroxide at a temperature of 150° F.

EXAMPLE 4

The procedure set forth in Example 1 was followed save instead of a bale of dried hops the separated lupulin glands of hops were treated with gaseous anhydrous ammonia at 100° F. This test was repeated at a temperature of 140° F.

EXAMPLE 5

The procedure set forth in Example 1 was followed save instead of a bale of dried hops the separated lupulin glands of hops were treated with vaporous aqueous sodium hydroxide at 100° F. This test was repeated at 150° F.

Although the practice of this invention has been described as a stepwise batch type operation, the practice of this invention is adaptable to a continuous type operation.

As will be apparent to those skilled in the art in the light of the foregoing disclosure, many modifications, alterations and substitutions are possible in the practice of this invention without departing from the spirit or scope thereof.

I claim:

1. A method for the treatment of hops material selected from the group consisting of dried hops and the separated lupulin glands of hops to produce a stable, improved hops product having an improved effectiveness when employed in a conventional brewing operation which comprises subjecting said hops material to a treatment operation involving contacting said hops material with a gaseous or vaporized alkaline-acting treating agent, including a separate subsequent treatment operation involving contacting said hops material with a gaseous or vaporized acid-acting or acidic treating agent, each of the aforesaid treatment operations being carried out at a temperature in the range about 35–200° F. and at a pressure in the range from about 5 pounds per square inch absolute up to about 30 pounds per square inch absolute and for a period of time in the range about 2–60 minutes.

2. A method in accordance with claim 1 wherein said alkaline-acting treating agent is selected from the group consisting of ammonia, ammonium hydroxide and sodium hydroxide.

3. A method in accordance with claim 1 wherein said alkaline-acting treating agent is anhydrous ammonia.

4. A method in accordance with claim 1 wherein said alkaline-acting treating agent is ammonium hydroxide.

5. A method in accordance with claim 1 wherein said alkaline-acting treating agent is sodium hydroxide.

6. A method in accordance with claim 1 wherein said hops material is subjected to a reduced, subatmospheric pressure to remove readily volatilizable materials therefrom prior to and subsequent to each of the treatment operations involving contacting said hops material with an alkaline-acting treating agent and an acid-acting or acidic treating agent.

7. A method for the treatment of baled, dried hops which comprises subjecting baled, dried hops to a reduced, subatmospheric pressure to effect the removal of readily volatilizable materials therefrom, contacting said hops with a gaseous or vaporized alkaline-acting treating agent for a period of time in the range about 2–60 minutes, at a pressure in the range from about 5 pounds per square inch absolute to about 30 pounds per square inch absolute and at a temperature in the range about 35–200° F., subjecting the thus-treated hops to a reduced, subatmospheric pressure to effect removal of alkaline-acting treating agent therefrom and contacting said hops with a gaseous or vaporized acid-acting or acidic treating agent to effect neutralization and/or removal of residual alkaline-acting treating agent from said hops, the contacting of said hops with said gaseous or vaporized acid-acting or acidic treating agent being carried out for a period of time in the range about 2–60 minutes at a temperature in the range about 35–200° F. and a pressure in the range from about 5 pounds per square inch absolute to about 30 pounds per square inch absolute.

8. A method in accordance with claim 7 wherein said alkaline-acting treating agent is selected from the group consisting of anhydrous ammonia, ammonium hydroxide and an alkali metal hydroxide.

9. A method in accordance with claim 7 wherein said gaseous or vaporized agent employed to effect neutralization and/or removal of residual alkaline-acting treating agent is selected from the group consisting of hydrogen chloride, vaporized hydrochloric acid and methyl chloride.

10. A method in accordance with claim 7 wherein subsequent to the treatment of said hops by said gaseous or vaporized agent to effect neutralization and/or removal of residual alkaline-acting treating agent, the hops is subjected to a reduced pressure for a period of time to remove readily volatilizable materials therefrom.

11. The baled hops product produced by the process of claim 7, said hops product being a stable hops product and having an improved effectiveness when employed as a hopping agent in a brewing operation as compared with conventional comparable hops material.

12. A method for the treatment of baled, dried hops which comprises subjecting baled, dried hops to a reduced pressure at a temperature in the range from ambient temperature up to about 200° F. for a period of time in the range about 2–30 minutes for the removal of moisture and other readily volatilizable materials therefrom, contacting said hops with a gaseous or vaporized alkaline-acting agent at a pressure in the range from about 5 pounds per square inch absolute up to about 30 pounds per square inch absolute for a period of time in the range about 2–60 minutes and a temperature in the range from about ambient temperature to about 200° F., subjecting said hops to a reduced, subatmospheric pressure for a period of time in the range about 2–50 minutes, subsequently subjecting said hops to treatment with a gaseous or vaporized acid-acting or acidic treating agent for a period of time in the range about 5–60 minutes at a temperature in the range about 35–200° F. and at a pressure in the range from about 5 pounds per square inch absolute to about 30 pounds per square inch absolute, subjecting said hops to a reduced, subatmospheric pressure for a period of time sufficient to removal substantially all of the readily volatilizable materials therefrom and recovering the resulting treated hops.

13. A method in accordance with claim 12 wherein said alkaline-acting agent is ammonia.

14. A method in accordance with claim 12 wherein said acid-acting or acidic treating agent is selected from the group consisting of hydrogen chloride, hydrochloric acid, sulfur dioxide, carbon dioxide and methyl chloride.

15. A method in accordance with claim 12 wherein said alkaline-acting treating agent is ammonia and wherein said acid-acting treating agent is hydrochloric acid.

16. A method in accordance with claim 12 wherein said acid-acting or acidic treating agent is employed in an amount to effect neutralization and/or removal of substantially all of the residual alkaline-acting treating agent on or from said hops.

17. A method in accordance with claim 12 wherein the treatment operations involving subjecting the baled, dried hops to a reduced subatmospheric, to contact with an alkaline-acting agent and to contact with an acid-acting or acidic treating agent are carried out in the same treatment zone or container.

References Cited

UNITED STATES PATENTS

| | | | |
|---|---|---|---|
| 2,473,395 | 6/1949 | Segal | 99—50.5 |
| 2,243,143 | 5/1941 | Wood | 99—50.5 |
| 3,104,974 | 9/1963 | Weimer | 99—50.5 |

OTHER REFERENCES

Klopper, "Rational Hopping," Wallerstein Laboratories Communications, June 1957, vol. XX, No. 69, pp. 109–116; p. 113 only, relied upon.

JOSEPH M. GOLIAN, Primary Examiner